United States Patent
Chen et al.

(10) Patent No.: US 6,581,169 B1
(45) Date of Patent: Jun. 17, 2003

(54) METHOD AND DEVICE FOR AUTOMATIC COMPUTER TESTING ON A PLURALITY OF COMPUTERS THROUGH A LOCAL AREA NETWORK

(75) Inventors: Tong S Chen, Taipei (TW); Kuang Shin Lin, Taipei (TW); Zhen Yu Hou, Tianjin (CN); Xiao Gang Liou, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/456,329

(22) Filed: Dec. 8, 1999

(51) Int. Cl.⁷ .................................................. G06F 11/00
(52) U.S. Cl. .............................. 714/47; 714/48; 714/37; 714/39; 714/25
(58) Field of Search .............................. 714/25–38, 47, 714/48

(56) References Cited

U.S. PATENT DOCUMENTS 5,519,603 A * 5/1996 Allbery et al. .................. 700/4
5,566,161 A * 10/1996 Hartmann et al. .......... 370/249
5,642,504 A * 6/1997 Shiga ........................... 707/10
5,822,520 A * 10/1998 Parker ........................ 709/217
5,950,188 A * 9/1999 Wildermuth .................. 707/10
6,421,667 B1 * 7/2002 Codd et al. ..................... 706/45

OTHER PUBLICATIONS

Microsoft, Computer Dictionary, 1997, Microsoft Press, Third Edition, 422–423.*

* cited by examiner

Primary Examiner—Nadeem Iqbal
Assistant Examiner—Timothy M. Bonura
(74) Attorney, Agent, or Firm—Birch, Stewart, Kolasch & Birch, LLP

(57) ABSTRACT

This specification discloses a method and device for computer testing, which method can perform automatic testing for a plurality of computer on the product line. By describing, recording, and summarizing contents and results of each test item using a script, the defects such as lower efficiency, more errors and longer testing time occurred in human operations can be conquered. The method comprises the steps of: building a structured query language (SQL) server; forming electrical communication between the SQL server and a plurality of computers to be tested; retrieving a command macro from the SQL server according to the command request sent out from the computer to be tested; controlling the computer to be tested to execute corresponding test commands according to the content of the command macro; receiving and analyzing the execution result of the test command; and displaying the testing result.

11 Claims, 5 Drawing Sheets

| Tool Name | Tool Parameter | Time Out | Repeat Count | Stop On Error |
|---|---|---|---|---|
| AMIDIAG | /R TEST0.INI | 1000 | 1 | Yes |
| IMGINST | M:\UNIXING 0/Y | 2000 | 1 | Yes |
| AMIDIAG | /R TEST1.INI | 1000 | 2 | Yes |
| AMIDIAG | /R TEST2.INI | 1000 | 1 | Yes |
| AMIDIAG | /R TEST3.INI | 1000 | 3 | Yes |

Fig.3

METHOD AND DEVICE FOR AUTOMATIC COMPUTER TESTING ON A PLURALITY OF COMPUTERS THROUGH A LOCAL AREA NETWORK

BACKGROUND OF THE INVENTION

1. Field of Invention

This invention relates to a method and device for computer testing and, in particular, to a method and device that can simultaneously perform automatic testing on a plurality of computers on the product line through a local area network (LAN) and summarizes and displays the testing result.

2. Related Art

In such a versatile world, the quality consciousness of the consumers is promoted and the merchandise sale has become more and more competitive. The quality of the merchandise has widely taken as the most effective point to promote the competitive power. The once famous concept of quality guarantee in the past management practice is slowly evolved into and replaced by the concept of the consumer oriented total quality management (TQM). Therefore, when the enterprise is under the overall industry competition of high quality, low price, and short delivery time required by the consumers, the TQM is often needed to rectify the company structure, to strengthen its competitive power, and to create and maintain the market superiority.

Although TQM has become the main quality control method and concept and the essays on TQM clearly state that TQM is not only a technical issue, it is also involved with problems in all management levels, yet the technical aspect of quality management is still one of the most important factors. In the technical aspect of quality management, the integration and application of computers are widely confirmed and recommended both by academia and in practice.

Taking the computer product line as an example, each computer manufactured in the production process has to be controlled, tested, observed, and data recorded for each test procedure manually by test engineers. This does not have the defects of a lower efficiency, more errors, and longer testing time, the test engineer has to have experiences in apparatus operations, computer programming languages, program coding, etc, and must understand the concept of IEEE-488, the interface integration of the testing system software and hardware, and the command meaning and structure of the GPIB. The stipend cost is a lot. Furthermore, the conventional procedural control is done manually. Once the testing procedure is changed, the deployment of the whole product line and the employee training would be influenced. Therefore, it does not only lack of flexibility but also wastes production resources.

SUMMARY OF THE INVENTION

In view of the foregoing, a main object of the present invention is to provide a method and device for computer testing, which method can perform automatic testing for a plurality of computer on the product line. By describing and recording the content and result of each test using a script, the test results can be summarized and displayed. This computer testing method can not only decrease labor, but can also lower the stipend cost while at the same time increasing the product quality. When facing a varying production procedure, this method promises more flexibility.

To achieve the above object, the present invention discloses a method for computer testing, which comprises the steps of: building a structured query language (SQL) server; forming electrical communication between the SQL server and a plurality of computers to be tested; retrieving a command macro from the SQL server according to the command request sent out from the computer to be tested; controlling the computer to be tested to execute corresponding test commands according to the content of the command macro; receiving and analyzing the execution result of the test command; and displaying the testing result.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 3 is a schematic view of the command macro data structure according to the method for computer testing of the present invention.

DETAILED DESCRIPTION OF THE INVENTION

Figure 1:
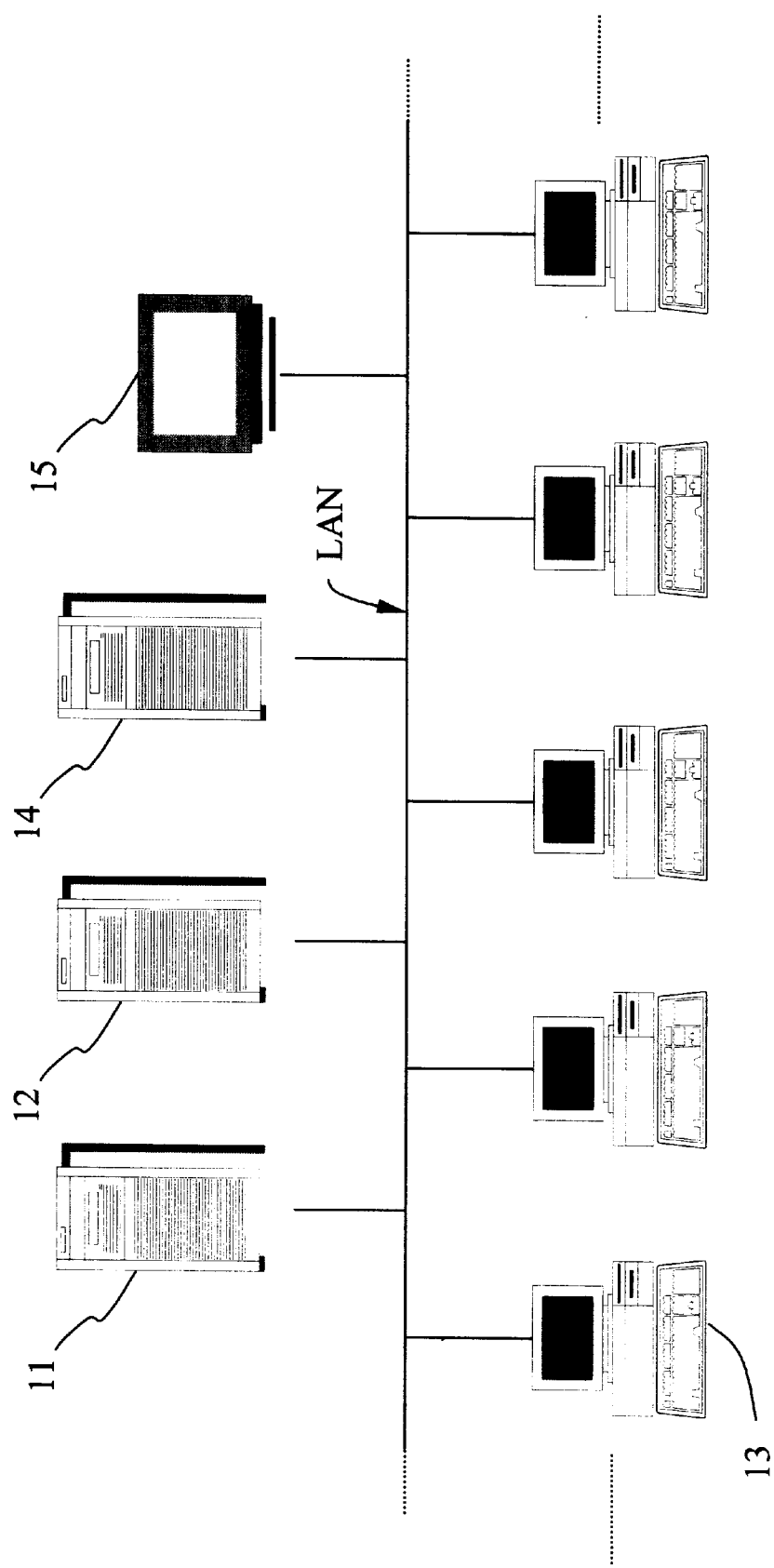
FIG. 1 is the diagram of a computer testing device of the present invention.

Referring to FIG. 1, the device for computer testing according to the instant invention comprises: a structured query language (SQL) server 11 for storing a command database; a control unit 12 for retrieving a command macro from the command database and controlling a plurality of computers 13 to be tested to execute this command macro; a file server 14 for storing related files for executing the command macro; a display unit 15 for display the execution result of this command macro; the SQL server 11, the control unit 12, the computer to be tested 13, the file server 14, and the display unit 15 being interconnected through a local area network (LAN).

Figure 2A:
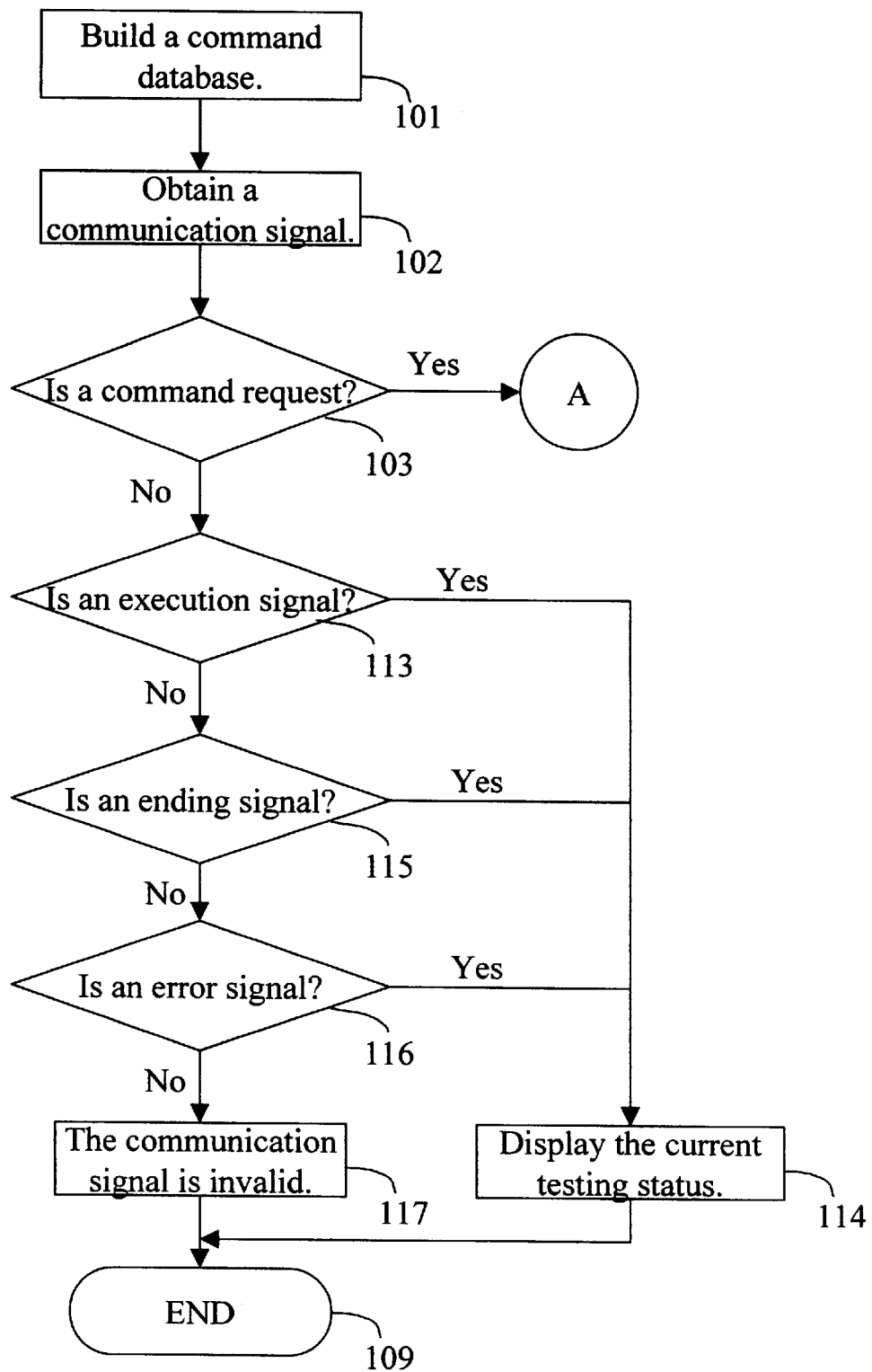
FIG. 2A is a control flow chart of the method for computer testing according to the present invention.
Figure 2B:
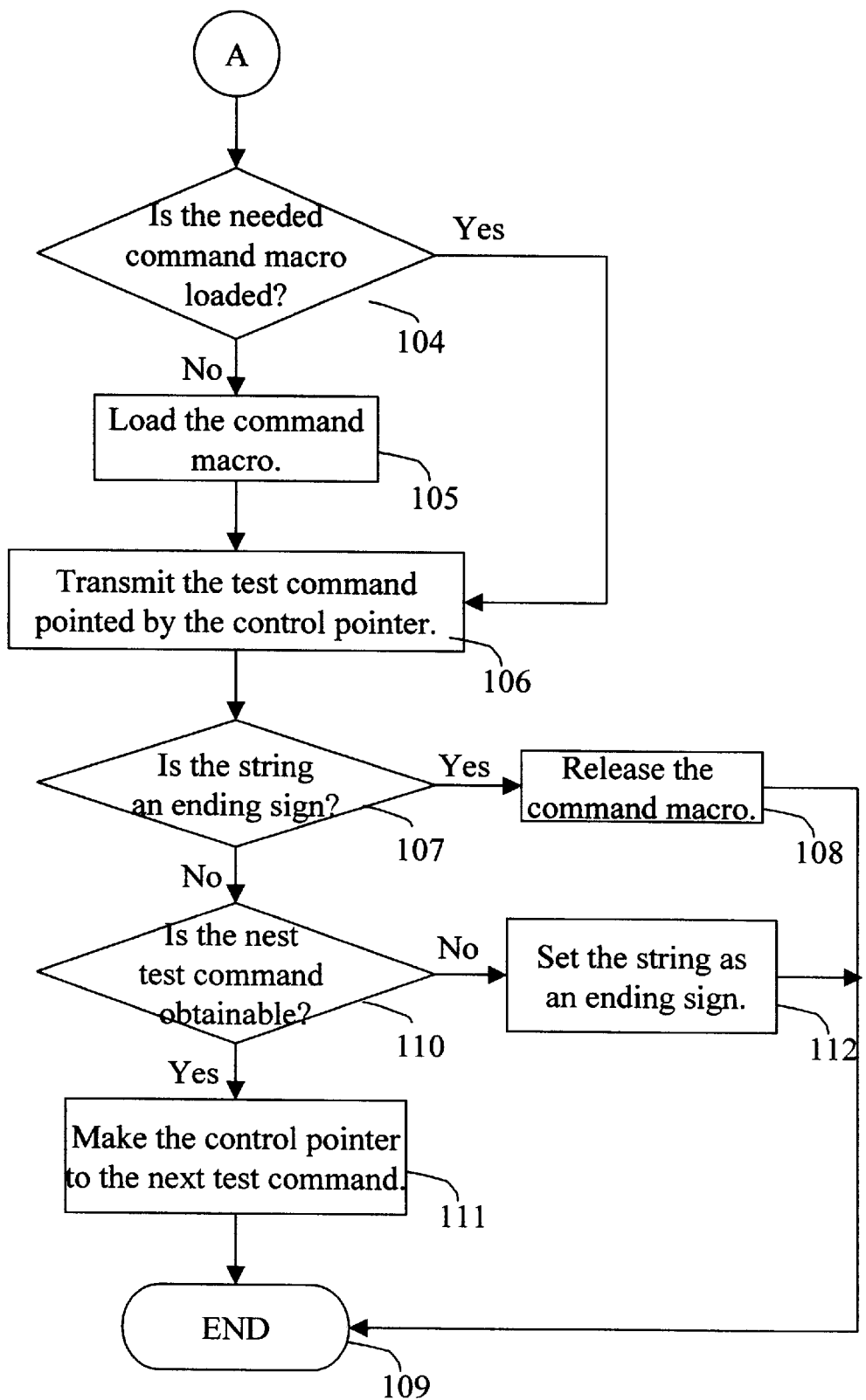
FIG. 2B is a control flow chart of the method for computer testing according to the present invention.

The detailed control flow chart of the method for computer testing according to the invention is shown in FIGS. 2A and 2B. First, a command database is built to store a command macro for controlling the procedure (step 101). As shown in FIG. 3, this command macro is written in a script and stores all command data needed for the operations in the procedure. The command data include a tool name, a tool parameter, and so on; wherein the tool name is the name of each test command and the tool parameter refers to the script that stores the execution parameters of each test command; the time out column indicates the upper limit of the operation time, the repeat count represents the repeat times of this test command, and if the status value of the stop on error column is set to "Yes" then that means if he execution of the test command has an error or the test command operation time exceeds the upper limit, the next test command has to be postponed. Then a communication signal is obtained from the computer to be tested via the LAN (step 102). It is determined if this communication signal is a command request for obtaining the next test command (step 103). If it is, it is then determined whether a command macro corresponding to this command request has been loaded (step 104). When the command macro has not yet loaded, the command macro is loaded from the command database (step 105); otherwise step 105 is omitted. The test command indicated by the current control pointer is transmitted to the computer to be tested (step 106). At this moment, a string representing the execution result of the command macro is obtained and determined whether it is an ending sign (step 107). When this string is an ending sign, that means all test commands in this command macro have been performed and the command macro is released (step 108). Finally, this method for computer testing finishes (step 109). In particular, if the determination result in step 107 indicates that the string is not an ending sign, then it is determined whether the next test command can be obtained (step 110). When the command macro still has the next test command, the current control pointer points to the next test command (step 111) and this method finishes (step 109). If there is no further test command in the command macro, then the string is set as an ending sign (step 112) and this method finishes (step 109).

If the communication signal is determined to be not a command request in step 103, then it is further determined whether this communication signal is an execution signal for the inception of execution (step 113). If it is, then the current test status is displayed according to this communication signal (step 114). Finally, this method for computer testing finishes (step 109). If the communication signal is determined to be not an execution signal in step 113, then it is determined if the communication signal is an ending signal for the termination of execution (step 114) and this method finishes (step 109). If this communication signal is not an ending signal either, then it is determined whether it is an error signal for the error in execution (step 116). If it is, then the current testing status is displayed according to the content of this communication signal (step 114); otherwise, this communication signal is taken as invalid (step 117). Finally, this method for computer testing finishes (step 109).

Figure 4:
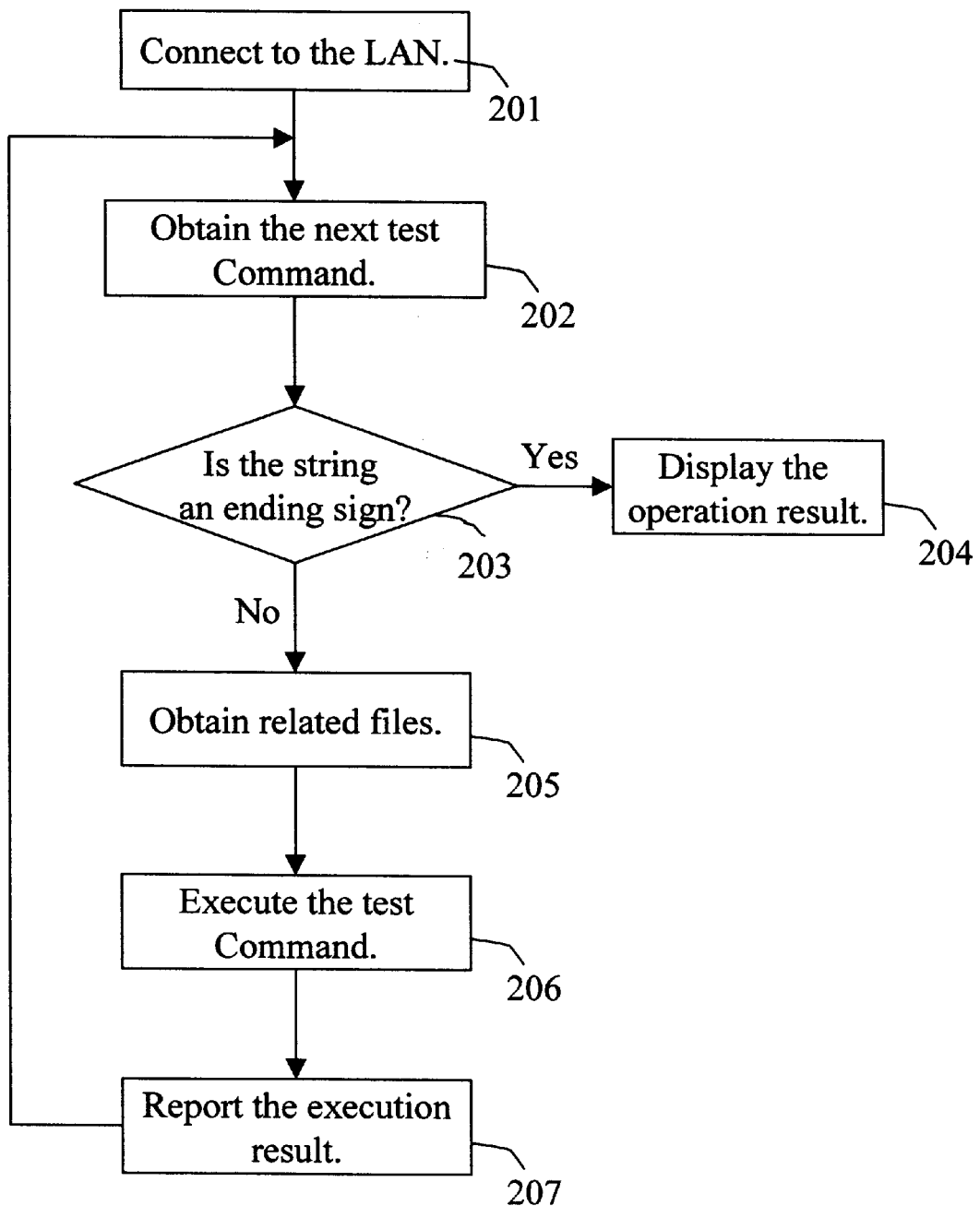
FIG. 4 is an operation flow chart of the computer to be tested according to the method for computer testing of the present invention.

According to the above control flow of the method for computer testing, it is only necessary to insert a floppy disc to each computer 13 to be tested, with the disc containing the procedures of controlling the computer 13 to be tested and the control unit 12 and of the connection to the file server 14. When the computer 13 to be tested is booted, it automatically requests for a test command from the control unit 12 and downloads, according to the response of the control unit 12, related files required by the test command from the file server 14 until all test command operations in the command macro are finished. A detailed operation flow of the computer to be tested is shown in FIG. 4. The computer is first connected to the LAN (step 201). The next test command pointed by the current control pointer is obtained (step 202). A string representing the execution result of the command macro is obtained and it is determined whether this string is an ending sign (step 203). If it is, then that means all test commands have been performed and the final result is displayed at this moment (step 204). If the string is not an ending sign, files related to the test command are obtained (step 205). Then the test command is executed (step 206). The execution result of the test command is then reported (step 207). The next test command is further obtained (step 202) until all test commands have been performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for computer testing for simultaneously performing tests on a plurality of computers on the product line, which method comprises the steps of:

providing an SQL server with command macros;

obtaining a communication signal from the plurality of computers to be tested;

when the communication signal is a command request, determining whether a command macro corresponding to the command request has been loaded;

when the command macro has been loaded, transmitting a test command pointed by a control pointer to the computer to be tested;

obtaining a string representing the execution result of the command macro;

releasing the command macro when the string is an ending sign; and finishing the method, further comprising the steps of:

determining whether the communication signal is an execution signal when it is not a command request;

displaying the test status when the communication signal is the execution signal; and finishing the method.

2. The method for computer testing of claim 1, which further comprises the steps of:

obtaining the next test command when the string is not an ending sign;

making the control pointer point to the next test command; and finishing the method.

3. The method for computer testing of claim 1, which further comprises the steps of:

treating the string as an ending sign when there is no further test command in the command macro; and finishing the method.

4. The method for computer testing of claim 1, which further comprises the steps of:

loading the command macro from a structured query language (SQL) server when the command macro has not yet loaded;

making the control pointer point to the first test command in the command macro; and transmitting the test command pointed by the control pointer to the computer to be tested.

5. The method for computer testing of claim 1, which further comprises the steps of:

determining whether the communication signal is an ending signal when it is not an execution signal;

displaying the test status when the communication signal is the ending signal; and finishing the method.

6. The method for computer testing of claim 1, which further comprises the steps of:

determining whether the communication is an error signal when it is not an ending signal;

displaying the test status when the communication signal is the error signal; and finishing the method.

7. The method for computer testing of claim 1, which further comprises the steps of;

invalidating the communication signal when it is not the error signal; and finishing the method.

8. The method for computer testing of claim 1, which further comprises the steps of:

building a command database; and storing the command macro into the command database.

9. The method for computer testing of claim 1, wherein the SQL server and the plurality of computers to be tested are connected through the LAN.

10. The method for computer testing of claim 1, wherein the command macro is a script.

11. The method for computer testing of claim 1, wherein the command macro comprises a tool name and a tool parameter.

* * * * *